(12) United States Patent
Ham

(10) Patent No.: US 9,602,640 B1
(45) Date of Patent: Mar. 21, 2017

(54) ADHESIVE HOOKS FOR RELEASABLY SECURING AN EARPIECE TO A MOBILE PHONE

(71) Applicant: Donald Matt Ham, Indianapolis, IN (US)

(72) Inventor: Donald Matt Ham, Indianapolis, IN (US)

(*) Notice: Subject to any disclaimer, the term of this patent is extended or adjusted under 35 U.S.C. 154(b) by 86 days.

(21) Appl. No.: 14/680,144

(22) Filed: Apr. 7, 2015

(51) Int. Cl.
*H04M 1/02* (2006.01)
*F16B 45/02* (2006.01)
*F16B 11/00* (2006.01)

(52) U.S. Cl.
CPC ......... *H04M 1/0258* (2013.01); *F16B 11/006* (2013.01); *F16B 45/02* (2013.01); *Y10T 24/33* (2015.01)

(58) Field of Classification Search
CPC ..... H04M 1/0258; F16B 11/006; F16B 45/02; Y10T 24/33
See application file for complete search history.

(56) References Cited

U.S. PATENT DOCUMENTS

| | | | | |
|---|---|---|---|---|
| 1,814,303 A * | 7/1931 | Finlay | ................... | F16B 47/003 206/813 |
| 2,724,568 A * | 11/1955 | Rabinovitch | ........ | A47G 1/1606 248/301 |
| 3,241,795 A | 3/1966 | Frye | | |
| 4,106,741 A | 8/1978 | Hogg | | |
| 4,181,553 A * | 1/1980 | Hogg | ....................... | A47G 1/17 156/211 |
| 4,317,555 A * | 3/1982 | Hogg | ..................... | A47G 1/168 248/467 |
| 4,432,120 A * | 2/1984 | Sherman, Jr. | .......... | B60K 15/04 220/375 |
| 4,756,498 A | 7/1988 | Frye | | |
| 5,921,514 A | 7/1999 | Schurmann | | |
| 6,427,293 B1 * | 8/2002 | Bowes, Jr. | .............. | F16B 45/02 24/114.6 |
| D531,487 S | 11/2006 | Dretzka | | |
| 7,255,313 B2 * | 8/2007 | Lane | ....................... | F16B 45/00 211/113 |
| 9,021,666 B2 * | 5/2015 | Sedivy | ....................... | A45F 5/02 24/304 |
| 2009/0229083 A1 | 9/2009 | DeKalb | | |
| 2009/0293239 A1 * | 12/2009 | Stumpfl | ............. | A44B 17/0011 24/306 |

(Continued)

FOREIGN PATENT DOCUMENTS

EP    1869997    12/2007

*Primary Examiner* — Robert J Sandy
*Assistant Examiner* — Louis Mercado
(74) *Attorney, Agent, or Firm* — Kyle A. Fletcher, Esq.

(57) ABSTRACT

The adhesive hooks for releasably securing an earpiece to a mobile phone includes a set of self-adhering hooks that are each configured to selectively secure an earpiece to a mobile phone or smart phone when said earpiece is not in use. The set of self-adhering hooks are each further defined with a first hoop member and a second locking hoop member. Both the first hoop member and the second locking hoop member are affixed to a base. The base is further defined with an outer surface that includes a layer of adhesive thereon. The second locking hoop member is selectively secured to the first hoop member in order to secure said earpiece to the smart phone.

8 Claims, 3 Drawing Sheets

(56) References Cited

U.S. PATENT DOCUMENTS

| | | | |
|---|---|---|---|
| 2012/0039069 A1* | 2/2012 | Schrimmer | A41D 27/085 362/103 |
| 2012/0066874 A1* | 3/2012 | LeCompte | A44B 17/0005 24/304 |
| 2012/0260465 A1 | 10/2012 | Hunter | |
| 2012/0311827 A1 | 12/2012 | Wilson | |

* cited by examiner

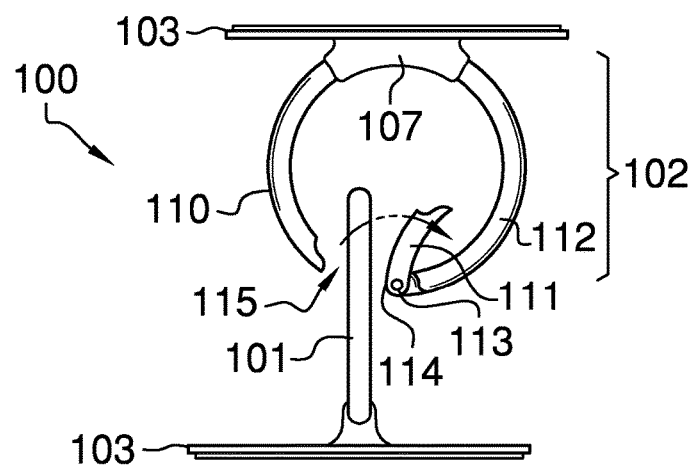
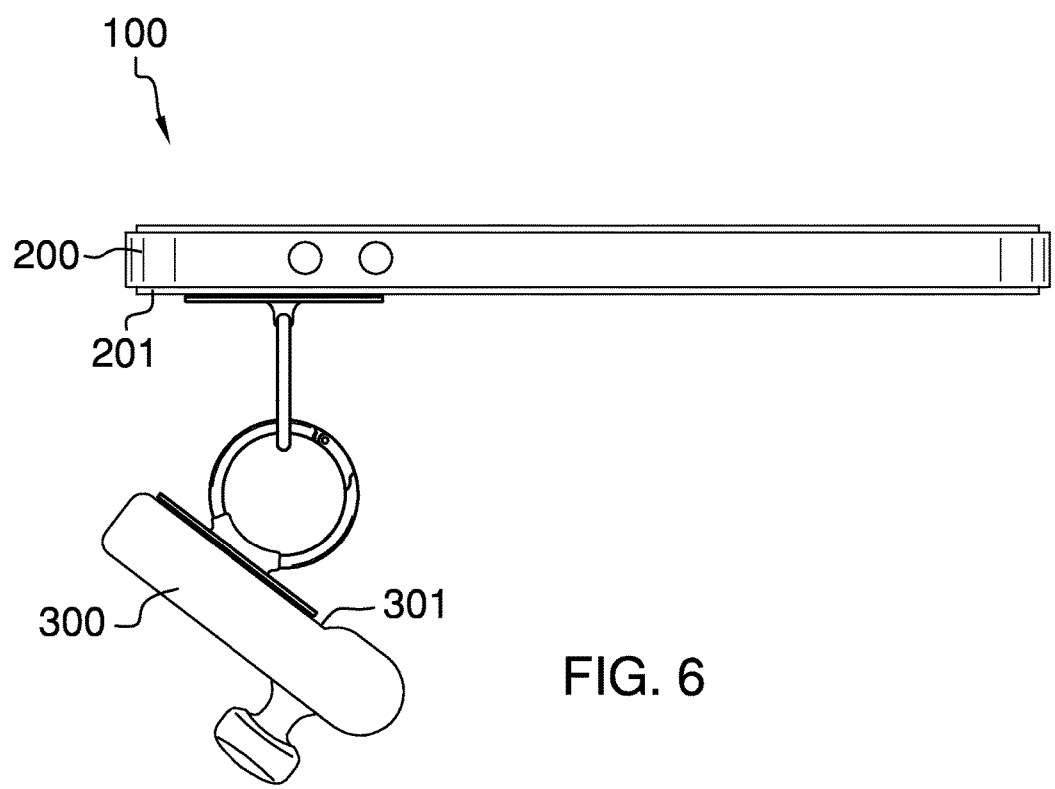

ADHESIVE HOOKS FOR RELEASABLY SECURING AN EARPIECE TO A MOBILE PHONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of hooks, more specifically, a hook uniquely adapted to be affixed to a rear surface of a mobile phone or smart phone in order to secure an earpiece thereto.

SUMMARY OF THE INVENTION

An embodiment of the disclosure meets the needs presented above by generally comprising a set of self-adhering hooks that are each configured to selectively secure an earpiece to a mobile phone or smart phone when said earpiece is not in use. The set of self-adhering hooks are each further defined with a first hoop member and a second locking hoop member. Both the first hoop member and the second locking hoop member are affixed to a base. The base is further defined with an outer surface that includes a layer of adhesive thereon. The layer of adhesive of the base is configured to secure the base to either a rear surface of a smart phone or to a planar surface of an earpiece. The second locking hoop member is selectively secured to the first hoop member in order to secure said earpiece to the smart phone. The second locking hoop member is further defined with a first hoop armature, a pivoting armature, and a second hoop armature. The pivoting armature is pivotably engaged via a spring-loaded hinge to a second distal end of the second hoop armature. The pivoting armature pivots with respect to the spring-loaded hinge in order to open or close the second locking hoop member.

These together with additional objects, features and advantages of the adhesive hooks for releasably securing an earpiece to a mobile phone will be readily apparent to those of ordinary skill in the art upon reading the following detailed description of presently preferred, but nonetheless illustrative, embodiments of the adhesive hooks for releasably securing an earpiece to a mobile phone when taken in conjunction with the accompanying drawings.

In this respect, before explaining the current embodiments of the adhesive hooks for releasably securing an earpiece to a mobile phone in detail, it is to be understood that the adhesive hooks for releasably securing an earpiece to a mobile phone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adhesive hooks for releasably securing an earpiece to a mobile phone.

It is therefore important that the claims be regarded as including such equivalent construction insofar as they do not depart from the spirit and scope of the adhesive hooks for releasably securing an earpiece to a mobile phone. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a front view of an embodiment of the disclosure.

FIG. 6 is a view of an embodiment of the disclosure in use.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
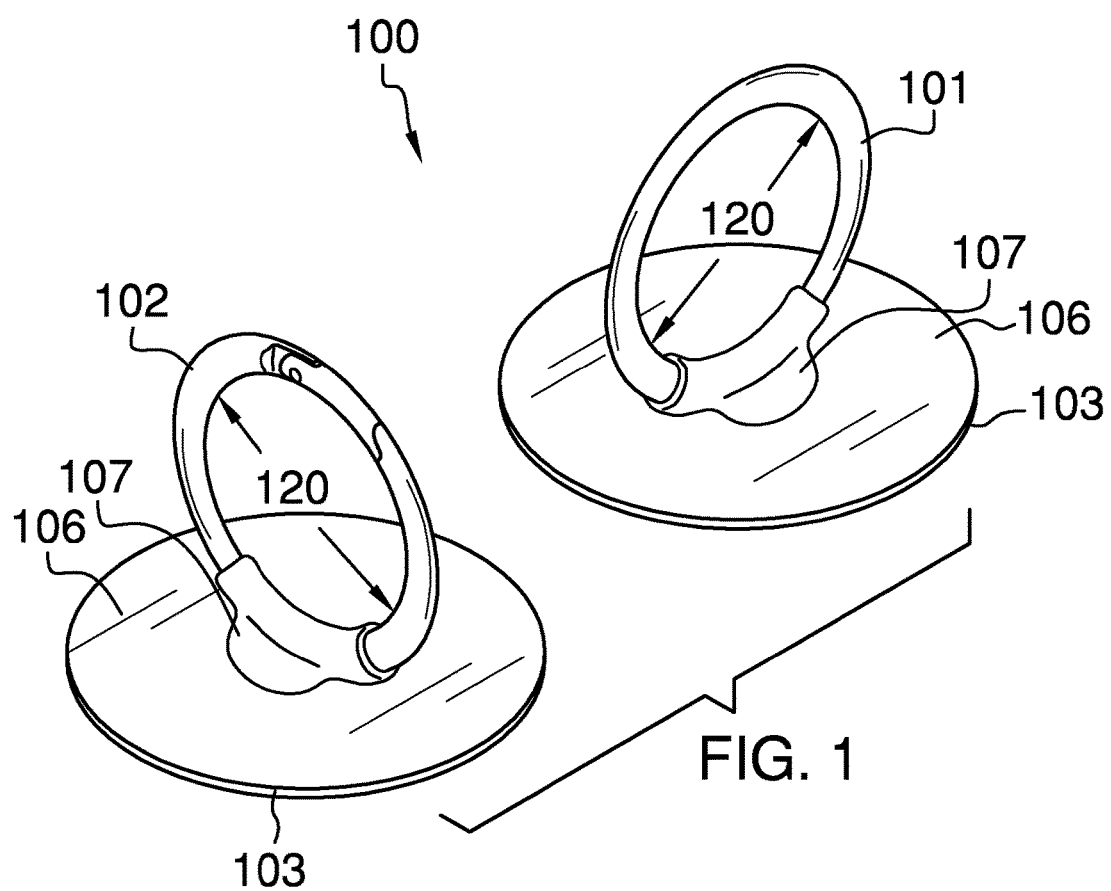
FIG. 1 is a first perspective view of an embodiment of the disclosure.
Figure 2:
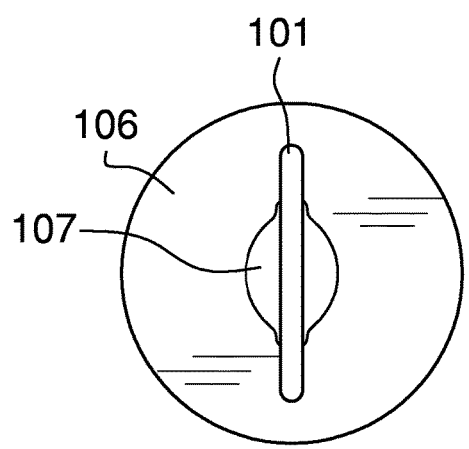
FIG. 2 is a top view of an embodiment of the disclosure.
Figure 3:
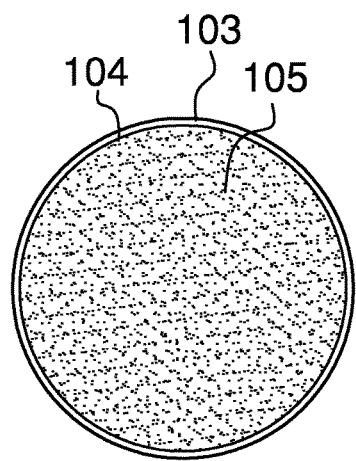
FIG. 3 is a bottom view of an embodiment of the disclosure.
Figure 4:
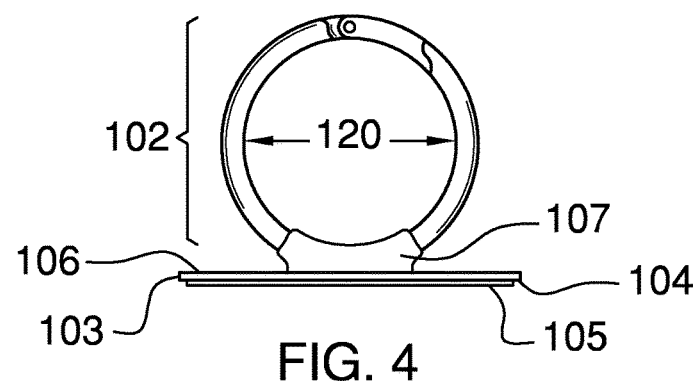
FIG. 4 is a side view of an embodiment of the disclosure.

As best illustrated in FIGS. 1 through 6, the adhesive hooks for releasably securing an earpiece to a mobile phone 100 (hereinafter invention) generally includes a first hoop member 101 and a second locking hoop member 102. Both the first hoop member 101 and the second locking hoop member 102 are affixed to a base 103. The base 103 is further defined with an outer surface 104 that includes a layer of adhesive 105 thereon. The base 103 is further defined with an interior surface 106 from which the first hoop member 101 or the second locking hoop member 102 is affixed to and extends from. Moreover, a hoop bracket 107 is attached to the interior surface 106 of the base 103 as well as either the first hoop member 101 or the second locking hoop member 102.

The first hoop member 101 and the second locking hoop member 102 each have a hoop diameter 120. The hoop diameter 120 is consistent between both the first hoop member 101 and the second locking hoop member 102. Moreover, the hoop diameter 120 is not less than 0.25 inches in diameter.

The layer of adhesive 105 of the base 103 is configured to secure the base 103 to either a rear surface 201 of a smart phone 200 or to a planar surface 301 of an earpiece 300. The second locking hoop member 102 is selectively secured to the first hoop member 101 in order to secure said earpiece 300 to the smart phone 200. It shall be noted that the term smart phone 200 is being used to refer to and include all cell phones, mobile phones, PDAs, tablet computers, etc.

The second locking hoop member 102 is further defined with a first hoop armature 110, a pivoting armature 111, and a second hoop armature 112. The pivoting armature 111 is pivotably engaged via a spring-loaded hinge 113 to a second distal end 114 of the second hoop armature 112. The pivoting armature 111 pivots with respect to the spring-loaded hinge 113 in order to provide temporary access to an opening 115 that exists between the first hoop armature 110 and the second hoop armature 112. The opening 115 enables the first hoop member 101 to slide thereon, and secure to the second locking hoop member 102.

Referring to FIG. 6, the invention 100 can be used as depicted or in a reverse orientation. More specifically, the earpiece 300 may have the second locking hoop member 102 affixed thereto, and the smart phone 200 may have the first hoop member 101 affixed thereto. Alternatively, the earpiece 300 may have the first hoop member 101 affixed thereto, and the smart phone 200 may have the second locking hoop member 102 affixed thereto.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A set of self-adhering hooks for releasably securing an earpiece to a mobile phone comprising:
   a first hoop member is configured to be attached to a rear surface of a smart phone;
   a second locking hoop member is configured to be attached to a planar surface of the earpiece;
   wherein the second locking hoop member is selectively secured to the first hoop member in order to secure the earpiece relative the smart phone when said earpiece is not in use;
   wherein both the first hoop member and the second locking hoop member are each affixed to a base;
   wherein the base is further defined with an outer surface that includes a layer of adhesive thereon; wherein the base is further defined with an interior surface from which the first hoop member or the second locking hoop member is affixed to and extends from;
   wherein a hoop bracket is attached to the interior surface of the base as well as either the first hoop member or the second locking hoop member;
   wherein the first hoop member and the second locking hoop member each have a hoop diameter;
   wherein the layer of adhesive of the base is configured to secure the base to either the rear surface of the smart phone or to the planar surface of the earpiece;
   wherein the second locking hoop member is further defined with a first hoop armature, a pivoting armature, and a second hoop armature.

2. The set of self-adhering hooks according to claim 1 wherein the hoop diameter is consistent between both the first hoop member and the second locking hoop member.

3. The set of self-adhering hooks according to claim 1 wherein the hoop diameter is not less than 0.25 inches in diameter.

4. The set of self-adhering hooks according to claim 1 wherein the pivoting armature is pivotably engaged via a spring-loaded hinge to a second distal end of the second hoop armature.

5. The set of self-adhering hooks according to claim 4 wherein the pivoting armature pivots with respect to the spring-loaded hinge in order to provide temporary access to an opening that exists between the first hoop armature and the second hoop armature; wherein the opening enables the first hoop member to slide thereon, and secure to the second locking hoop member.

6. A set of self-adhering hooks for releasably securing an earpiece to a mobile phone comprising:
   a first hoop member is configured to be attached to a planar surface of the earpiece;
   a second locking hoop member is configured to be attached to a rear surface of a smart phone;
   wherein the second locking hoop member is selectively secured to the first hoop member in order to secure the earpiece relative the smart phone when said earpiece is not in use;
   wherein both the first hoop member and the second locking hoop member are each affixed to a base; wherein the base is further defined with an outer surface that includes a layer of adhesive thereon; wherein the base is further defined with an interior surface from which the first hoop member or the second locking hoop member is affixed to and extends from;
   wherein a hoop bracket is attached to the interior surface of the base as well as either the first hoop member or the second locking hoop member;
   wherein the first hoop member and the second locking hoop member each have a hoop diameter;
   wherein the hoop diameter is consistent between both the first hoop member and the second locking hoop member; wherein the hoop diameter is not less than 0.25 inches in diameter;
   wherein the layer of adhesive of the base is configured to secure the base to either the rear surface of the smart phone or to the planar surface of the earpiece;
   wherein the second locking hoop member is further defined with a first hoop armature, a pivoting armature, and a second hoop armature.

7. The set of self-adhering hooks according to claim 6 wherein the pivoting armature is pivotably engaged via a spring-loaded hinge to a second distal end of the second hoop armature.

8. The set of self-adhering hooks according to claim 7 wherein the pivoting armature pivots with respect to the spring-loaded hinge in order to provide temporary access to an opening that exists between the first hoop armature and the second hoop armature; wherein the opening enables the first hoop member to slide thereon, and secure to the second locking hoop member.

* * * * *